United States Patent [19]
Black et al.

[11] Patent Number: 6,038,599
[45] Date of Patent: Mar. 14, 2000

[54] LATENCY SERVER AND MATCHMAKER

[75] Inventors: Norman R. H. Black, Half Moon Bay; Jeffrey J. Rothschild, Los Gatos, both of Calif.

[73] Assignee: Mpath Interactive, Inc., Mountain View, Calif.

[21] Appl. No.: 08/915,545

[22] Filed: Aug. 13, 1997

Related U.S. Application Data

[60] Provisional application No. 60/044,109, Apr. 23, 1997.

[51] Int. Cl.⁷ .................................................. G06F 13/00
[52] U.S. Cl. .......................................................... 709/223
[58] Field of Search ................................... 709/203, 204, 709/218, 223, 205, 209, 217, 219, 224, 225, 226, 227, 229, 239

[56] References Cited

U.S. PATENT DOCUMENTS

| | | | |
|---|---|---|---|
| 5,083,800 | 1/1992 | Lockton | 273/439 |
| 5,114,155 | 5/1992 | Tillery et al. | 273/371 |
| 5,187,790 | 2/1993 | East et al. | 395/725 |
| 5,324,035 | 6/1994 | Morris et al. | 273/138 A |
| 5,329,619 | 7/1994 | Pagé et al. | 395/200 |
| 5,341,477 | 8/1994 | Pitkin et al. | 395/200 |
| 5,350,176 | 9/1994 | Hochstein et al. | 273/148 B |
| 5,351,970 | 10/1994 | Fioretti | 273/439 |
| 5,359,510 | 10/1994 | Sabaliauskas | 364/410 |
| 5,367,635 | 11/1994 | Bauer et al. | 395/200 |
| 5,422,883 | 6/1995 | Hauris et al. | 370/62 |
| 5,426,427 | 6/1995 | Chinnock et al. | 340/827 |
| 5,442,749 | 8/1995 | Northcutt et al. | 395/200.09 |
| 5,459,837 | 10/1995 | Caccavale | 395/184.01 |
| 5,491,797 | 2/1996 | Thompson et al. | 395/200.03 |
| 5,497,491 | 3/1996 | Mitchell et al. | 395/700 |
| 5,513,126 | 4/1996 | Harkins et al. | 364/514 A |
| 5,517,622 | 5/1996 | Ivanoff et al. | 395/200.13 |
| 5,522,044 | 5/1996 | Pascucci et al. | 395/200.06 |
| 5,524,253 | 6/1996 | Pham et al. | 395/800 |
| 5,547,202 | 8/1996 | Tsumura | 463/29 |

(List continued on next page.)

OTHER PUBLICATIONS

Cotton, J., "History of Kali and iFrag", from http://www.las.es/kali/history.html, Dec. 28, 1995, pp. 1–3, (as downloaded Aug. 11, 1998).

Cotton, J. and Coleman, S., "The TCP/IP Internet Gamer's FAQ,", Internet newsgroup posting (May 24, 1995, pp. 1–9, Available at www.dejanews.com.

Cronin, D., "MUD Games on the Internet", *Dr.Dobb's Information Highway Sourcebook*, Winter 1994, pp. 22–25.

Fitzgibbons, P., "Telegaming: A Survey of On–Line Gaming Opportunities", *Softalk*, vol. 2, Mar. 1984, Cover sheet plus 4 pages beginning at p. 89.

Fowler, D., "Treading the Boards", *Computer Shopper*, Aug. 1994, pp. 612–613.

"Game Connection Pro", URL:http:www.sirussoft.com/Gameinfo.htm, Date unknown (Downloaded Jan. 22, 1998), 4 pages.

Habig, A., Re: "Normal Lag?!?", Internet newsgroup posting (Jun. 22, 1995), pp. 1–2, Available at www.dejanews.com.

(List continued on next page.)

*Primary Examiner*—Moustafa M. Meky
*Attorney, Agent, or Firm*—Sterne, Kessler, Goldstein & Fox PLLC

[57] ABSTRACT

A method and apparatus to efficiently and effectively ensure that the quality of the data communications links are adequate for digital electronic game playing is provided. A number of servers are connected to the Internet. The servers periodically perform communications link quality measurements among themselves. At least one of the servers is designated as a matchmaker. When a game is requested by clients, the matchmaker acts as a game coordinator and compiles the results of the measurements. Based on the compilation and other information from its database, the matchmaker selects a few servers as candidate servers. These candidates perform data communications link quality measurements with the requesting clients. Based on these measurements, the matchmaker selects a server as the server for the requested game.

29 Claims, 5 Drawing Sheets

U.S. PATENT DOCUMENTS

| | | | |
|---|---|---|---|
| 5,548,726 | 8/1996 | Pettus | 395/200.09 |
| 5,553,239 | 9/1996 | Heath et al. | 395/187.01 |
| 5,559,933 | 9/1996 | Boswell | 395/114 |
| 5,560,005 | 9/1996 | Hoover et al. | 395/600 |
| 5,560,008 | 9/1996 | Johnson et al. | 395/650 |
| 5,572,582 | 11/1996 | Riddle | 379/202 |
| 5,580,309 | 12/1996 | Piechowiak et al. | 463/16 |
| 5,586,257 | 12/1996 | Perlman | 463/42 |
| 5,586,937 | 12/1996 | Menashe | 463/41 |
| 5,590,360 | 12/1996 | Edwards | 395/800 |
| 5,593,349 | 1/1997 | Miguel et al. | 463/30 |
| 5,594,910 | 1/1997 | Filepp et al. | 395/800 |
| 5,600,833 | 2/1997 | Senn et al. | 395/601 |
| 5,816,918 | 10/1998 | Kelly et al. | 463/16 |
| 5,823,879 | 10/1998 | Goldberg et al. | 463/42 |
| 5,828,843 | 10/1998 | Grimm et al. | 709/228 |
| 5,838,909 | 11/1998 | Roy et al. | 709/209 |
| 5,862,339 | 1/1999 | Bonnaure et al. | 709/227 |
| 5,879,236 | 3/1999 | Lambright | 463/42 |
| 5,894,556 | 4/1999 | Grimm et al. | 395/200.57 |

OTHER PUBLICATIONS

"Here I will go over the setup of slippr15 an Ifrag for a modem", from http://www.anglianet.co.uk/home/lighter/slip.html, Date unknown, pp. 1–9, (as downloaded Aug. 11, 1998).

"Here is how to set up an ethernet card for Ifrag", from http://www.anglianet.co.uk/home/lighter/ethernet.html, Date unknown, pp. 1–9, (as downloaded Aug. 11, 1998).

James, R. and Sphinx, L., "Creating Your Own Multiplayer Game Systems", *Dr. Dobb's Information Highway Sourcebook*, Winter 1994, pp. 56–64.

"Kali: IPX across the net", URL:http://worldvillage.com/wv/gamezone/html/feature/mayhem/mayhem2.htm, Downloaded Jan. 22, 1998, (4 pages).

Keizer, G., "Dial–a–Duel", *Computer Shopper*, Jun. 1993, pp. 606–608.

Keizer, G., "Playing the Field: Online gaming matches your wits against real opponents", *OMNI*, Mar. 16, 1993, p. 18.

Kennedy, Ben, "Tikkiman's Guide to Ifrag", from http://www.students.haverford.edu/bkennedy/html/ifrag.htm, Apr. 20, 1996, pp. 1–8, (as downloaded Aug. 11, 1998).

"Kesmai Launches Aries '96" and other links from https://www.gamestorm.com, Downloaded Feb. 11, 1998, (29 pages).

Levinson, Aaron, "Re: New Internet Doomer. Help!", Internet newsgroup posting (Aug. 23, 1995), pp. 1–2, Available at www.dejanews.com.

"MGYP", URL:http://www/azstarnet.com/~ruc/yellow/prime.htm, Downloaded Jan. 22, 1998, (2 pages).

"Modem Combat", *Compute*, Sep. 1994, Cover sheet plus 4 pages beginning at p. 86.

"Multiplayer Database FAQ", URL:http://www.crazyfox.com/multiplayer/faq.shtml, Downloaded Jan. 22, 1998, (2 pages).

"Multiplayer Dot Com (Multiplayer Gaming Networks)", URL:http://www.multiplayer.com/networks.html, Copyright 1996, 1997, Downloaded Jan. 22, 1998, 8 pages.

"Multiplayer Dot Com (Tools)", URL:http://www.multiplayer.com/tools.html, Copyright 1996, 1997, Downloaded Jan. 22, 1998, 2 pages.

"Multiplayer Games", URL:http://www.lycos.com/wguide/wire_867716_49646_2_0.html, Jan. 21, 1998, (2 pages).

"Multiplayer Games with Graphical Interface", *Newmedia*, Nov. 1994, Cover sheet plus 2 pages including p. 63.

"Multiplayer Internet Gaming" and other links from http://www.teleport.com, Downloaded Jan. 22, 1998, (26 pages).

"Online game sites compete for fans" and other links from http://www.dwango.com, Copyright 1997, Downloaded Jan. 22, 1998, (8 pages).

"On line gaming", URL:http://www.geocities.com/ResearchTriangle/5431/online.html, (May 27, 1996), Downloaded Jan. 22, 1998, (3 pages).

"Online Gaming", *PCGamer*, vol. 3, No.5, May 1996, pp. 70 and 72.

Peterson, L.L., "A Yellow–Pages Service for a Local–Area Network", *Computer Communication Review* (*ACM Press Proceedings*), Aug. 11–13, 1988, pp. 235–242.

"Recreation:Games:Internet Games: Interactive Web Games:Multi–User Games", URL:http://www.yahoo.com/Recreation/Games/Internet_Games/Interactive_Web_Games/Multi_, Downloaded Jan. 22, 1998, (2 pages).

"Release 1.0", Esther Dyson's Monthly Report, Jun. 27, 1994, pp. 1–18.

Silverman, D., "Cyberspace arcade links Doom fans", *Houston Chronicle*, Sep. 28, 1994, (2 pages).

Silverthorne, S., "Doom", *PCWeek*, vol. 11, No. 43, Oct. 31, 1994, pp. A/1, A/10 and A/12.

Spear, P., "Online Games People Play", *Compute*, Nov. 1991, p. 96(3).

"The Internet Gaming Zone", URL:http://www.zone.com/zonepromo/gamelist.asp, Downloaded Jan. 22, 1998, (2 pages).

"Zarf'List of Interactive Games on the Web", URL:http://www.leftfoot.com/games/html, Downloaded Jan. 22, 1998, (3 pages).

LATENCY SERVER AND MATCHMAKER

RELATED APPLICATIONS

This application claims the benefit of U.S. Patent Provisional Application Serial No. 60/044,109, filed Apr. 23, 1997 entitled "SPECTATOR AND MATCHMAKER SERVER" which is hereby incorporated by reference.

FIELD OF THE INVENTION

The invention generally relates to multi-user distributed electronic digital computer systems, and more particularly relates to computer based game network systems.

BACKGROUND OF THE INVENTION

In recent years, advances in computer technology have fueled an explosive growth in digital electronic games. The latest digital electronic games combine three dimensional (3D) graphics with special effects sounds to make playing the games a realistic experience for the players. Advances in computer technology have also allowed the proliferation of inter-networks notably the Internet.

Given the amount of information on the Internet as well as the speed and costs of using the Internet, it is not surprising that the Internet is widely used as a research tool as well as for general business purposes such as advertising and commercial transactions. Another use of the Internet that is currently gaining popularity is digital electronic game playing.

In using the Internet for digital electronic game playing, players from distant geographical locations, who have computers equipped for digital electronic game playing, can share in a single game. Because of the populace that are connected to the Internet, the pool of able and willing players for a game is greatly increased. On the other hand, the very vastness of the Internet makes performing such a search a significant challenge. More importantly, the poor quality of the data communications links between the computers of the players can cause undesirable effects such as lagging wherein the response time of a player is slow due to latency, connection quality, etc.. Such communications problems can make players frustrated and can therefore greatly diminish the joy and pleasure of playing a digital electronic game.

Efforts have been made in the Prior Art to overcome some of the above shortcomings. To overcome the difficulty of finding able and willing players for a game, some Prior Art commercial game systems, with the help of a liaison computer, allow players to exchange messages, organize themselves into groups based on their ability level, and schedule games based on the information gathered. In some cases, the liaison computer serves as a game coordinator to get the appropriate players together for a game.

On the other hand, to improve the quality of the communications links between the players computers, one Prior Art commercial game system requires specially designed modems to establish point-to-point telephone links with low latency between players. This method may be non-optimal because it requires the player to have specially designed modems which significantly narrows the pool of candidate players.

Another Prior Art commercial game system uses servers, computers that are connected to the Internet by permanent links having high bandwidth and low latency, the server computers act as a liaison between the players both before and during game play. Generally, client home computers are connected to the Internet by temporary links (e.g., using the ordinary telephone system). In this commercial game system, a measurement is performed by the player computer executing a software program on the player computer. In general, latency measurement is a measurement of a typical message's transit time between two Internet nodes. Accordingly, a lower latency measurement translates to a higher quality of the link. An assumption here is that if each of the players has a good connection to the server, then the players will have a good connection to each other. If the players determine that the quality of the links is sufficient for the game at hand, the game begins.

In yet another Prior Art, each player (also known as client computer) determines the quality of the communications link to all the servers in terms of latency measurement and/or other criteria such as bandwidth and error rates. The quality measurements are then provided to a predetermined server which is designated as a matchmaker to select a game server to act as the game liaison for the players based on latency measurement and other predetermined criteria. The function of the game server depends on whether the game is a peer-to-peer game or a client-server game, and other factors.

In the Prior Art, having the player computers make quality measurements is an added burden that may slow down the operation speed of the player computers. One reason is that data communication links between player computers and the server/matchmaker are transitory links that typically use the ordinary telephone system for connection to the server/matchmaker. In general, transitory links are slow in transit times, have low modulation rates, have low data throughput rates, are error prone, and are not entirely reliable. As such, each of the player computers needs to perform the quality measurements every time it wants to start a game to ensure of that the quality needed is met. Because it is prudent to perform the quality measurements at regular intervals up until just before game time and because each latency measurement may take several seconds to make, the total amount of overhead required in ensuring the quality of the data communications link may indeed become a significant overhead to make prospective players impatient.

Furthermore, given the error prone and unreliable nature of the transitory links between player computers and servers, it is possible that when the quality measurements results are sent from the player computers to the server/matchmaker, the information may be lost thereby requiring a retransmission and consequent delay. Such inconveniences mentioned above are reasons as to why the Prior Art may be non-optimal.

Thus, a need exists for a more effective and more efficient technique to ensure that the quality of the data communications links employed are well adapted for digital electronic game playing.

SUMMARY OF THE INVENTION

Accordingly, the present invention provides an effective and efficient technique to ensure that the quality of the data communications links are well adapted for on-line application such as digital electronic game playing.

The present invention meets the above need with method to ensure that the quality of data communication links are adequate for using an application program over a communications network that is coupled to a number of server computers. Under the present invention, each of the server computers stores the network addresses of the server computers. Moreover, at least one of the server computers is designated a matchmaker.

In accordance with the present invention, the matchmaker first instructs the server computers to perform communications link quality measurements among the server computers. The results from the communications link quality measurements are then compiled by the matchmaker. Next, in response to a request from at least one of the client computers which are coupled to the communications network for using the application program, the matchmaker determines at least one communications link quality criterion required for using the application program.

Based on the communications link quality criteria and the compiled results of the communications link quality measurements, the matchmaker selects a number of candidate server computers. The matchmaker then instructs the candidate servers selected to perform communications link quality measurements between the candidates selected and the client computers. Subsequently, the results from the communications link quality measurements between the candidates selected and the client computers are compiled by the matchmaker.

Based on the results compiled, the matchmaker determines whether any of the candidates selected qualifies under the communications link quality criteria for using the application program. If any server qualifies under the communications link quality criteria, the matchmaker selects and notifies qualified servers.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. It is to be appreciated that although the description relates to digital electronic games, the invention is applicable to other types of computer application programs such as word processors, simulations, electronic data processing (EDP), and others.

Figure 1:
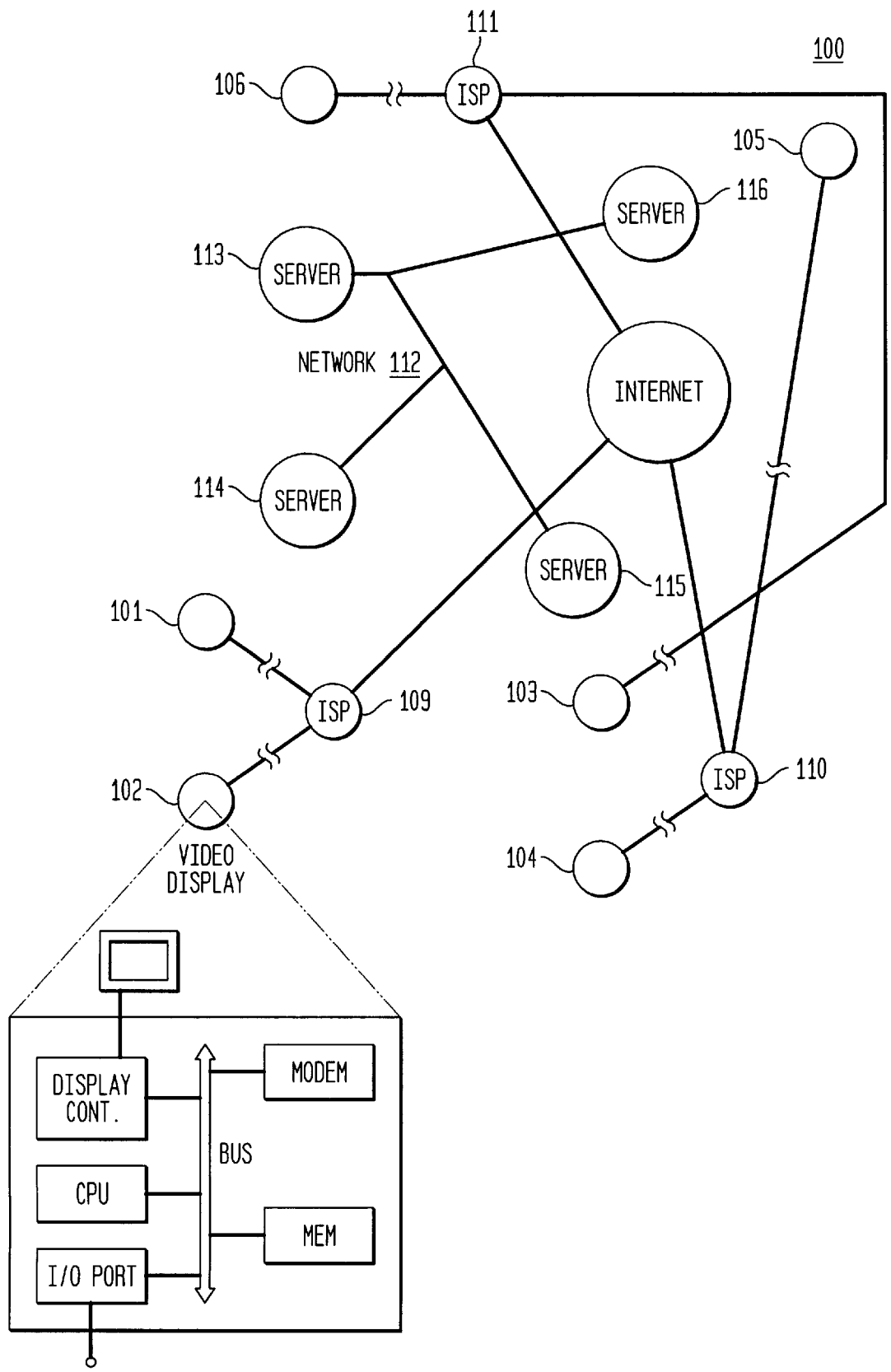
FIG. 1 is a high level diagram illustrating a typical data communications network implementing the present invention.

Reference is made to FIG. 1 illustrating a high level diagram of a typical data communications inter-network 100 implementing an embodiment of the present invention. As shown in FIG. 1, the data communications network includes a number of client player computers 101–106 each having a modem (shown only for computer 102 for reasons of clarity) to use in connecting client computers 101–106 to the Public Switched Telephone Network (PSTN, not shown) which connect client computers 101–106 to remote routers 109–111 which are installed by their respective Internet Service Providers (ISPs). Each of client player computer 101–106 typically includes a micro processing unit (MPU), a display controller, at least one serial port, and a modulator-demodulator (Modem) which are connected to each other by a system bus. The display controller generates video signals representing application or game environment to the display. Each client player computer 101–106 may be further connected to local input control devices such as keyboard, joysticks, track balls at its input/output port(s).

It is to be appreciated that computers 101–106 can be connected to remote routers 109–111 via other types of networks such as the Integrated Services Digital Network (ISDN). Any of computers 101–106 could alternatively be connected to routers 109–111 on a permanent circuit basis using data communications hardware such as a T1 connection (an unswitched synchronous connection).

Remote routers 109–111 connect the client computers 101–106 to client-server network 112 via some communication hardware such as routers, broadband synchronous digital telecommunications circuits, etc. In the preferred embodiment, the client-server network 112 is implemented using the Internet. Application (game) servers 113–116 are connected to client-server network 112 which may be implemented using high performance unswitched circuits.

In the preferred embodiment the server network 112 is implemented on top of the Internet, each server has a low latency connection to an Internet backbone circuit. In the case where the server network 112 is not implemented on top of the Internet, then at least one high performance connection (not shown) between server network 112 and an inter-network (which could but need not be the Internet) is required so that player computers 101 to 106 may communicate with the network 112 and servers 113–116.

Application (game) servers 113–116 are typically installed by an online digital electronic game service provider to perform the necessary tasks of coordinating on-line games for client computers 101–106. Preferably, at least one application (game) server is placed in close Internet proximity to each major population center. It is to be appreciated that servers 113–116 can also be used in providing other types of computer application services such as word processors, simulations, electronic data processing (EDP), and others.

Figure 2:
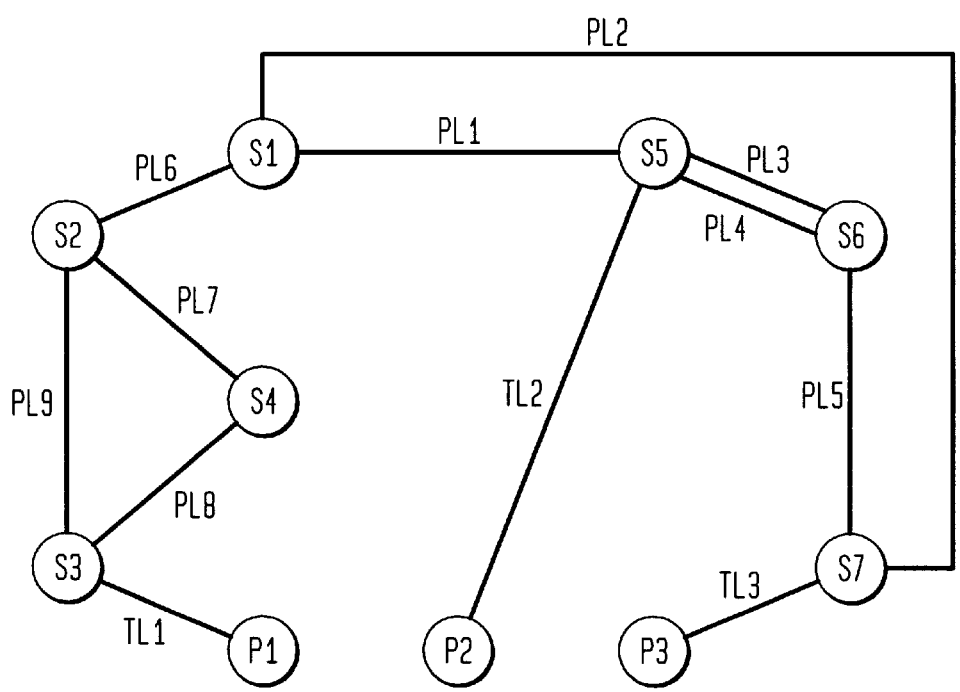
FIG. 2 illustrates a simplified connection diagram between some client computers and some servers according to the communications network arrangement described of FIG. 1.

Referring now to FIG. 2 illustrating, as an example, a connection diagram between some client computers (paradigmatically player computers) and some game servers in conformance with the communications network arrangement described in FIG. 1 above. However, for the sake of simplicity and clarity, details related to the connections between the client computers and the Internet as well as details related to the connections between the game servers and the Internet are omitted. As such, only the connections between the clients and the servers and between the servers themselves are shown. As can be seen in FIG. 2, servers S1–S7 and clients P1–P3 are connected to each in a relatively unstructured topology. As discussed earlier, while the connections/links between servers are permanent, the connections between clients and servers are transitory. Accordingly, the permanent links between the servers S1–S7 are PL1–PL9 and the transitory links between clients P1–P3 and servers S1–s7 are TL1–TL3. FIG. 2 also demonstrates that due to the nature of the Internet, while the players may be located close to each other geographically, they may be located far apart in terms of Internet connections. This is so because while the players may be close to each other geographically, the players may be connected to different servers that are only indirectly connected to each other. Hence, to communicate to each other, the players have to communicate through inter-network gateways (not shown).

Figure 3:
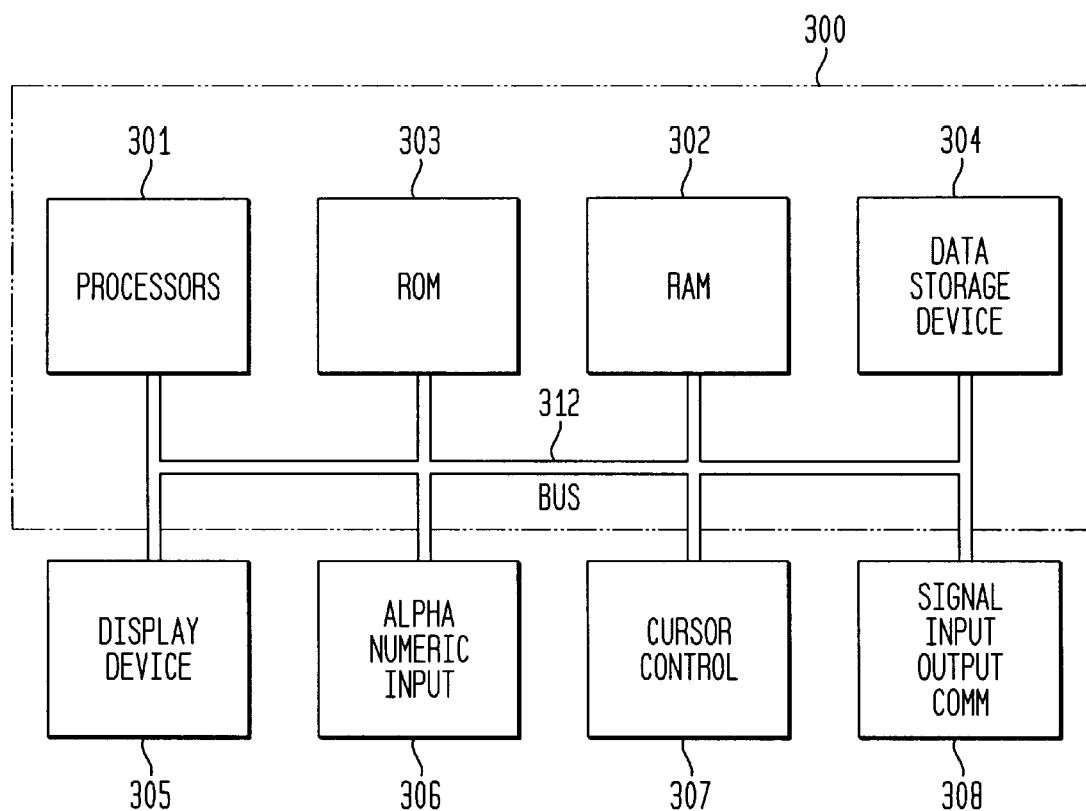
FIG. 3 illustrates a typical server computer connected to the data communications network of FIG. 1 in accordance to the present invention.

Reference is made to FIG. 3 illustrating a block diagram of a typical server computer system 300 upon which the present invention may be implemented or practiced. Server computer system 300 is connected to the Internet in the fashion described in the discussion related to FIG. 1 (supra). It is to be appreciated that server computer system 300 is exemplary only and that the present invention can operate within a number of different computer systems including general purpose computers systems, embedded computer systems, and others. In the following discussions of the present invention, certain processes and steps that are realized as a series of instructions (e.g., software program) that reside within computer readable memory units of system 300 and executed by processors of system 300.

In general, server computer system 300 used by the present invention comprises address/data bus 312 for conveying information and instructions, one or more processors 301 coupled with bus 312 for processing information and instructions, a random access memory (RAM) 302 for storing digital information and instructions, a read only memory (ROM) 303 for storing information and instructions of a more permanent nature. In addition, server computer system 300 may also include a data storage device 304 (e.g., a magnetic, optical, floppy, or tape drive) for storing vast amounts of data, and an I/O interface 308 for interfacing with peripheral devices (e.g., computer network, modem, etc.). Moreover, computer system 300 may include a display device 305 for displaying information to a computer user, an alphanumeric input device 306 (e.g., keyboard), and a cursor control device 307 (e.g., mouse, track-ball, light-pen, etc.) for communicating user input information and command selections.

In accordance with the present invention, servers perform and manage the communication link quality measurements. The results of the quality measurements are compiled, by one or more designated server known as matchmakers, to select a game server whose communications link quality meets the standard required for the particular game selected by the players. When such a game server is available, the matchmaker signals the server and the players that the game may begin.

Figure 4:
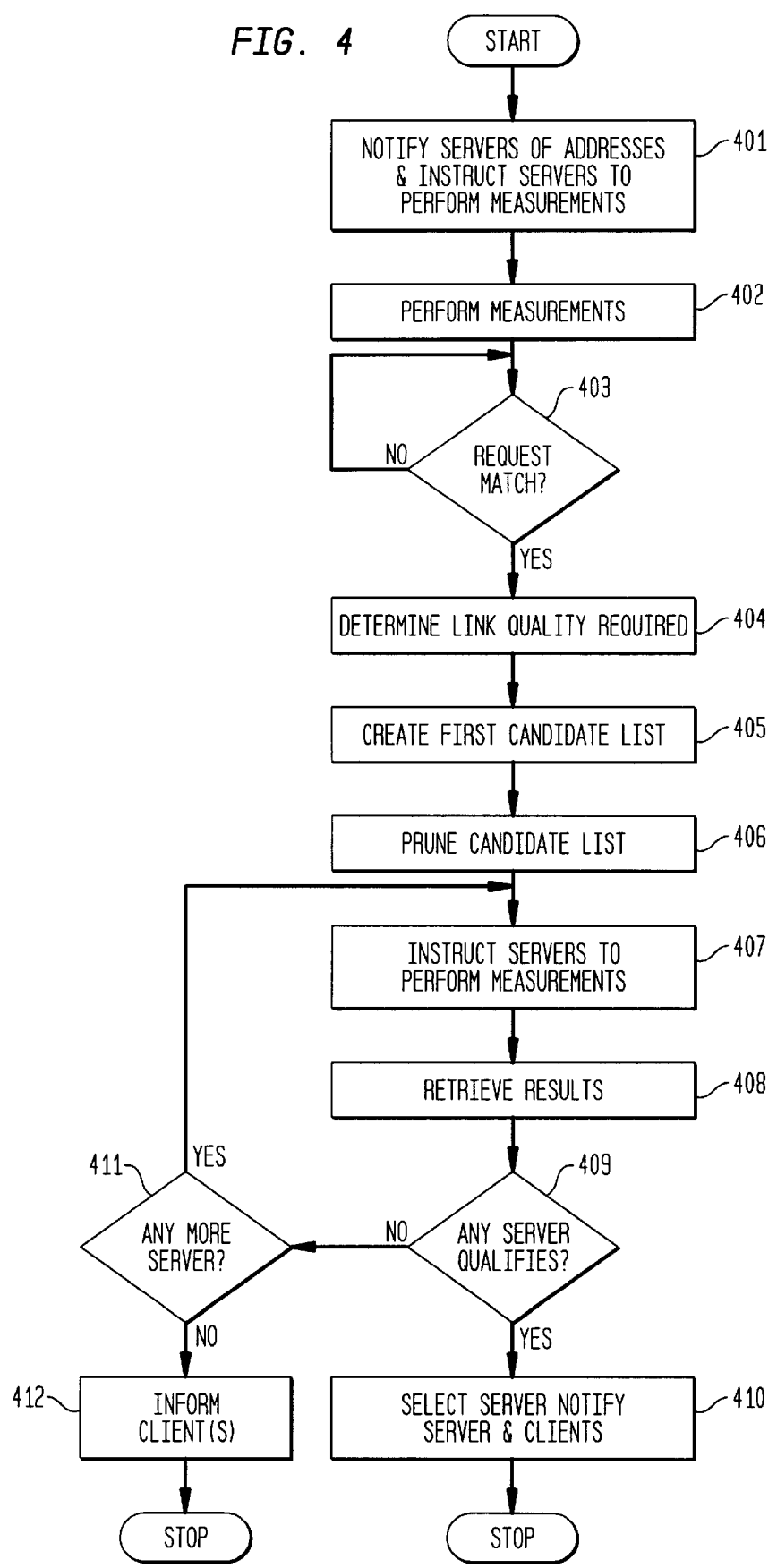
FIG. 4 is a flow chart illustrating an embodiment of the implemented steps of the latency server and matchmaker technique in accordance with the present invention.

Reference is now made to FIG. 4 illustrating the computer implemented steps to carry out an embodiment of the latency server and matchmaker scheme in accordance with the present invention. In general, the steps in FIG. 4 are designed to implement the above scheme. The steps in FIG. 4 are carried out when processor 301 executes the instruction codes stored in memory of computer system 300. It is to be appreciated that the steps described (infra) are illustrative only and other sequences of steps could be used within the general scope of the invention.

A cycle begins in step 401 when the matchmaker notifies all the servers in the application (game) service provider network of the network addresses of all servers. It is clear to a person of ordinary skill in the art that the role of the matchmaker can be performed by a single designated server or by a group of servers acting in concert. The matchmaker also instructs (step 401) the servers to perform mutual communications link quality measurements with respect to all the other servers (step 402). Communication link quality measurements may, for example, be latency, bandwidth, error rates, or combinations of these, or other. Methods of determining figures of merit for communications link by means of measurements are well known in the arts. For example, typically the communication link quality involves latency measurement, and the Packet Internet Gophers (PING) applications software which operates the Internet Control Message Protocol (ICMP) can be employed to determine an indication of the packet transit time between two servers.

The communication link quality measurements are performed at intermittent intervals, rather than continuously, so as to minimize the resulting consumption of network resources (overhead). The communication link quality measurements need not be done frequently because the topology of the server network and the capabilities of the servers change only gradually over time in many cases. Hence, the communication link quality is relatively stable. Also, to the extent that the quality may change capriciously, any more frequent measurement would be of little value, so such additional measurement does not need to be made.

In step 402, the matchmaker server retrieves the result of the quality measurement from each server and creates a connectivity database reflecting the connectivity for each server. Preferably, such data retrieval is carried out according to an orderly schedule so that the database can be updated in a timely manner. The matchmaker server continually monitors to determine whether a match is requested by a client player that has access to the network (step 403). Whenever a match is requested, the matchmaker determines the required communications link quality based on the type of application (game) requested and information, including criteria, related to the particular application (game) contained in its databases (step 404).

Next, the matchmaker creates a first pool of candidate application (game) servers which are capable to carry out the type of application (game) that has been requested (step 405). These candidate application/game servers are selected without reference to the properties of their communications links at this stage.

It may be that the servers making up this first pool are so numerous that it would be infeasible or inefficient (or simply take too long) to measure communications parameters between each of the servers and the prospective client that is to join the match. For this reason, it may be necessary to prune the pool thus creating a second and smaller pool.

The principle involved is that if two servers are very well connected one to the other (having for example a very low latency, very high data rate, and low error rate on their mutual link) then performance measurements from each server separately to a client will likely yield very similar results. If on the other hand, for example, the latency between the two servers is relatively high, then it is likely that measuring the latency between a client and each of these servers will indeed result in significantly differing measurements. The criteria for identifying groups of servers likely to produce similar communications link quality measurement results are directly related to the corresponding criteria required for application operability. For example, if the application were to require a worst case client to server latency of 500 milliseconds, then one might arbitrarily take say 5 percent of that figure and say that two servers that have a mutual latency of less than 25 milliseconds are likely to produce client to server latency measurement results within 25 milliseconds and so measuring from one is good enough to qualify or disqualify both servers from a client to server latency standpoint within a reasonable degree of accuracy. On the other hand, if the mutual latency between the two were more than 25 milliseconds then separate measurements might be desired.

Thus, from this first pool of candidate servers, the matchmaker selects a second, subset pool upon the basis of the inter-server communications link quality results already compiled (step 406).

Next, the matchmaker instructs the selected servers to perform communications link quality measurements with the players/clients which are requesting the application (game) (step 407). Preferably, the number of servers in the second pool is small enough such that if the selected servers simultaneously perform the measurements, network performance is not significantly impacted and no player/client is inundated with requests.

Upon the completion of the measurements in steps 407, the matchmaker retrieves the quality measurements from the selected servers (step 408). Using the information available in its database, the matchmaker determines whether any of these selected server meets the communication link quality requirement for the requested application (game) (step 409). If the quality requirement involves only latency, then the total latency between a server and each client player is computed.

In the present embodiment, the most qualified server so selected does not automatically become the server assigned to the application (game) instance, but rather forms a basis for selecting the server to be assigned. The server to actually be assigned is selected based upon further criteria, especially including the communications link quality measurement results for that most qualified server. Typically, the server to be actually assigned is a server in proximity to the most qualified server. Thus, the assigned server will, in most cases, be a member of the first pool, but not a member of the second pool.

All being well, the matchmaker assigns the server selected from the first pool and notifies that assigned server as well as the clients/players in step 410. If there are no qualified server, the matchmaker determines if the second pool can usefully be expanded (step 411). If so, steps 407–409 are repeated for this new second pool. Otherwise, the matchmaker informs the clients/players that the game cannot proceed (step 412).

Although all of the steps above are desirable in the present embodiment, it is clear to a person of ordinary skill in the art that some steps may be omitted during implementation and still be within the scope of the invention.

Figure 5:
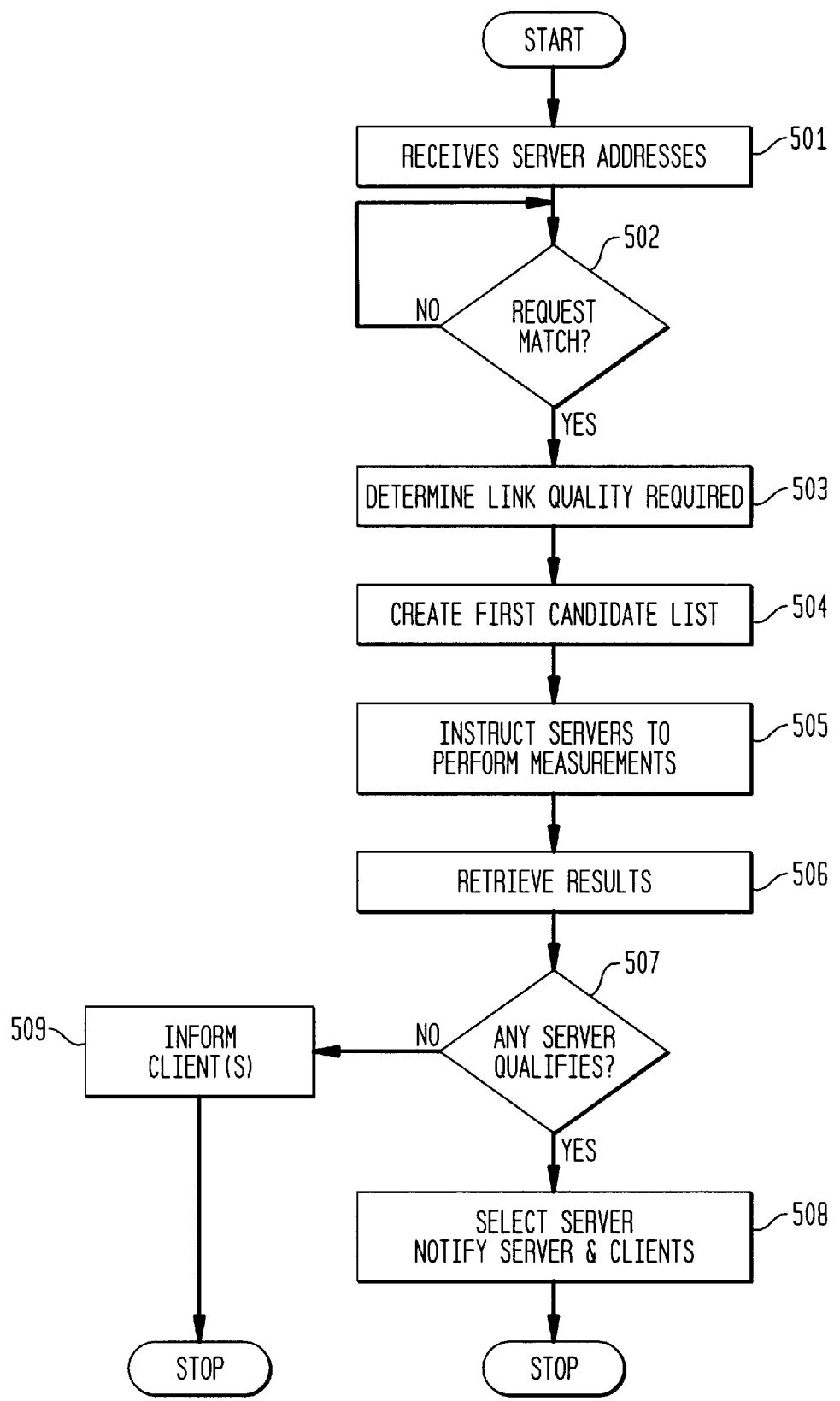
FIG. 5 is a flow chart illustrating the implementation of steps in an alternative embodiment of the latency server and matchmaker technique in accordance with the present invention.

FIG. 5 illustrates the computer implemented steps to carry out an alternate embodiment of the latency server and matchmaker scheme in accordance with the present invention. It is to be appreciated that the steps described (infra) are illustrative only and other sequences of steps could be used within the general scope of the invention. The steps in FIG. 5 are carried out when processor 301 executes the instruction codes stored in memory of computer system 300.

A cycle begins in step 501 when the matchmaker receives the network addresses of all servers on the permanent networks. It is clear to a person of ordinary skill in the art that the role of the matchmaker can be performed by a single designated server or by a group of servers acting in concert.

In step 502, the matchmaker server continually monitors to determine whether a match is requested by a client player which has access to the network. Whenever a match is requested, the matchmaker determines the required communications link quality based on the type of application (game) requested and information related to the particular application (game) contained in its database (step 503).

Next, the matchmaker creates a first pool of candidate application (game) servers which are capable to carry out the type of application (game) that has been requested (step 504). These candidate application (game) servers are selected without reference to the properties of their communications links.

Next, the matchmaker instructs the first pool of servers to perform communications link quality measurements with the players/clients which are requesting the application (game) (step 505). Preferably, the number of servers is small enough such that if the selected servers simultaneously perform the measurements, network performance is not significantly impacted and no player/client is inundated with requests. Alternatively, the measurements can be made sequentially to achieve the same purpose.

Upon the completion of the measurements in step 505, the matchmaker retrieves the quality measurements from the selected servers (step 506). Using the information available in its database, the matchmaker determines whether any of these selected servers meet the communication link quality requirement for the requested application (game) (step 507). If the quality requirement involves only latency, then the total latency between a server and each client player is computed.

In this alternative embodiment, the most qualified server so selected automatically becomes the server assigned to the application (game) instance. The matchmaker assigns the server selected from the first pool and notifies that assigned server as well as the clients/players in step 508. If there is no qualified server, the matchmaker informs the clients/players that the game cannot proceed (step 509).

An efficient and effective technique to ensure that the quality of the data communications links are adequate for digital electronic game playing, is described supra. While the present invention has been described in particular embodiments, the present invention should not be construed as limited by such embodiments, but rather construed according to the below claims.

What is claimed is:

1. A method to assign a client computer running an application program to one server computer amongst a plurality of server computers comprising the steps of:

performing communications link quality measurements among the plurality of server computers;

classifying the plurality of servers into a plurality of groups according to the communications link quality measurements, wherein servers belonging to a particular group exhibit the same approximate communications link quality measurements;

designating a plurality of representative servers, wherein at least one server from each server group is selected as a representative server for that particular group;

in response to a request from the client computer, determining a minimum communications link quality criterion required for using the application program;

selecting a qualified server computer from the plurality of representative server computers, wherein the measured communication link quality criterion of the qualified sever meets the minimum communication link quality criterion;

selecting a final server computer from the group of server computers to which the qualified server computer belongs;

establishing data communications between the final server computer and the client computer.

2. The method of claim 1, wherein the application software is a game.

3. The method of claim 1, wherein the data communications is established through an Internet communications network.

4. The method of claim 1, wherein the communications link quality measurements involve latency measurement.

5. The method of claim 1, wherein the communications link quality measurements involve bandwidth measurements.

6. The method of claim 1, wherein the communications link quality measurements involve error rate measurements.

7. In a communications network coupling to a plurality of server computer systems, each of the plurality of server computer systems storing the network addresses of the plurality of server computer systems, at least one of the plurality of server computer systems being designated to a matchmaker, the matchmaker server computer system adapted to ensure that the quality of data communication links are adequate for using an application program over the communications network, the matchmaker server computer system comprising:

a bus;

a processor coupled to the bus;

memory coupled to the bus; and a data communications device coupled to the bus and the communications network;

wherein the memory storing instruction codes, the instruction codes when executed by the processor performing the following steps: instructing the server computer systems to perform communications link quality measurements among the plurality of server computers; classifying the plurality of servers into a plurality of groups according to the communications link quality measurements, wherein servers belonging to a particular group exhibit the same approximate communications link quality measurements; designating a plurality of representative servers, wherein at least one server from each server group is selected as a representative server for that particular group: in response to a request from the client computer, determining a minimum communications link quality criterion required for using the application program; selecting a qualified server computer from the plurality of representative server computers, wherein the measured communication link quality criterion of the qualified server meets the minimum communication link quality criterion selecting a final server computer from the group of server computers to which the qualified server computer belongs; establishing data communications between the final server computer and the client computer.

8. The matchmaker server computer system of claim 7, wherein the application software is a game.

9. The matchmaker server computer system of claim 7, wherein the data communications is made over the Internet.

10. The matchmaker server computer system of claim 7, wherein the communications link quality measurements involve latency measurement.

11. The matchmaker server computer system of claim 7, wherein the communications link quality measurements involve bandwidth measurements.

12. The matchmaker server computer system of claim 7, wherein the communications link quality measurements involve error rate measurements.

13. A system to match one or more client computers requesting participation in a multi-user application program and an application server, in a computer network having a plurality of application servers and a plurality of client computers, comprising:

means for determining a first group of candidate application servers for running the application program;

means for determining a communication link quality criteria required for using the application for each communication link between each of the one or more client computers requesting the application program and an application server in the first group of candidate application servers;

means for receiving at least one communication link quality measurement of each communication link among the candidate application servers of the first group; and means for pruning the first group of candidate application servers to form a second group of candidate application servers based on the at least one communication link quality measurement of each communication link among the candidate application servers of the first group and based on the communication link quality criteria.

14. The system of claim 13, further comprising:

means for instructing the candidate application servers of the first group to take the at least one communication link quality measurement of each communication link among the candidate application servers of said first group.

15. The system of claim 13, further comprising:

means for determining a qualified server from among the second group of candidate application servers which meets the communication link quality criteria.

16. The system of claim 15, further comprising:

means for selecting the qualified server, to run the application program requested by the one or more client computers.

17. The system of claim 16, further comprising:

means for notifying the qualified server, to run the application program requested by the one or more client computers.

18. The system of claim 15, further comprising:

means for selecting an application server from among the first group of candidate application servers, to run the application requested by the one or more client computers based on at least one communication link quality measurement between said application server and said qualified server and based on the communication link quality criteria.

19. The system of claim 18, further comprising:

means for notifying the application server selected from among the first group of candidate application servers, to run the application program requested by the one or more client computers.

20. The system of claim 15, wherein said means for determining a qualified server includes:

means for instructing the candidate application servers of the second group to take at least one communication link quality measurement for each communication link between each candidate server of said second group and each of the one or more client computers requesting the application program; and means for compiling the results of said at least one communication link quality measurement for each communication link between each candidate server of said second group and each of the client computers requesting the application program.

21. The system of claim 20, wherein said means for determining a qualified server includes:

means for determining a most qualified server from among the second group of candidate application servers.

22. The system of claim 21, further comprising:

means for selecting the most qualified server to run the application program requested by the one or more client computers.

23. The system of claim 22, further comprising:

means for notifying the most qualified server to run the application program requested by the one or more client computers.

24. The system of claim 21, further comprising:

means for selecting an application server from among the first group of candidate application servers to run the application program requested by the one or more client computers based on at least one communication link quality measurement between said application server and said most qualified server and based on the communication link quality criteria.

25. The system of claim 24, further comprising:

means for notifying the application server selected from among the first group of candidate application servers to run the application program requested by the one or more client computers.

26. The system of claim 13, wherein the computer network is the Internet.

27. The system of claim 13, wherein the at least one communication link quality measurement includes at least one latency measurement.

28. The system of claim 13, wherein the at least one communication link quality measurement includes at least one bandwidth measurement.

29. The system of claim 13, wherein the at least one communication link quality measurement includes at least one error rate measurement.

* * * * *